United States Patent [19]

Chado et al.

[11] Patent Number: 4,875,733

[45] Date of Patent: Oct. 24, 1989

[54] VEHICLE REAR BODY STRUCTURE

[75] Inventors: Hiroyuki Chado; Tatsuo Maeda, both of Hiroshima; Mitsusou Nakano, Kure, all of Japan

[73] Assignee: Mazda Motor Corporation, Hiroshima, Japan

[21] Appl. No.: 166,099

[22] Filed: Mar. 9, 1988

[30] Foreign Application Priority Data

Mar. 10, 1987 [JP] Japan ................................ 62-54417
Mar. 12, 1987 [JP] Japan ................................ 62-57607

[51] Int. Cl.⁴ ...................... B62D 25/02; B62D 25/08
[52] U.S. Cl. .................................. 296/195; 296/203; 296/198
[58] Field of Search ............... 296/187, 191, 193, 195, 296/198, 203, 209, 29, 185

[56] References Cited

U.S. PATENT DOCUMENTS

| | | | |
|---|---|---|---|
| 2,240,022 | 4/1941 | Saives | 296/198 X |
| 3,423,122 | 1/1969 | Wessells, III | 296/185 |
| 3,517,765 | 6/1970 | Wessells, III et al. | 296/195 X |
| 4,234,225 | 11/1980 | Harasaki et al. | 296/198 X |
| 4,408,794 | 10/1983 | Harasaki | 296/198 |
| 4,552,400 | 11/1985 | Harasaki et al. | 296/203 X |
| 4,717,197 | 1/1988 | Harasaki | 296/187 |

FOREIGN PATENT DOCUMENTS

| | | | |
|---|---|---|---|
| 1430775 | 11/1968 | Fed. Rep. of Germany . | |
| 1932073 | 1/1971 | Fed. Rep. of Germany | 296/195 |
| 2432238 | 1/1976 | Fed. Rep. of Germany . | |
| 2712084 | 9/1978 | Fed. Rep. of Germany | 296/191 |
| 2931467 | 2/1980 | Fed. Rep. of Germany . | |
| 3521607 | 12/1986 | Fed. Rep. of Germany . | |
| 60-94873 | 5/1985 | Japan . | |
| 60-124574 | 7/1985 | Japan . | |
| 131377 | 7/1985 | Japan | 296/195 |
| 30467 | 2/1986 | Japan | 296/195 |
| 61-169375 | 7/1986 | Japan . | |
| 169375 | 7/1986 | Japan | 296/195 |
| 247577 | 11/1986 | Japan | 296/195 |
| 282172 | 12/1986 | Japan | 296/195 |
| 85769 | 4/1987 | Japan | 296/198 |

Primary Examiner—Dennis H. Pedder
Attorney, Agent, or Firm—Fleit, Jacobson, Cohn, Price, Holman & Stern

[57] ABSTRACT

A vehicle rear body structure including a rear side panel assembly comprising a rear inner panel made of a steel sheet and a rear fender made of a plastic material. The rear inner panel is formed at a lower portion with a tire house section. A tire house reinforcement of a closed cross section is formed along the tire house section and contiguous with a belt line reinforcement of a closed cross section formed along an upper edge portion of the rear inner panel. The tire house reinforcement and the belt line reinforcement are also contiguous with a center pillar structure of a closed cross section.

1 Claim, 17 Drawing Sheets

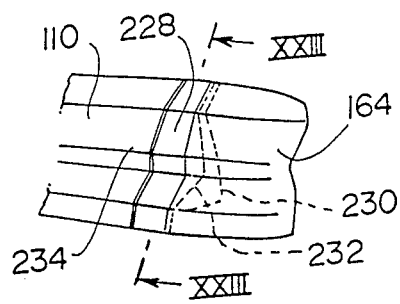
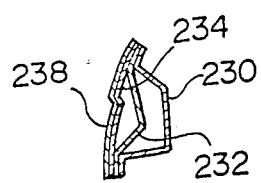
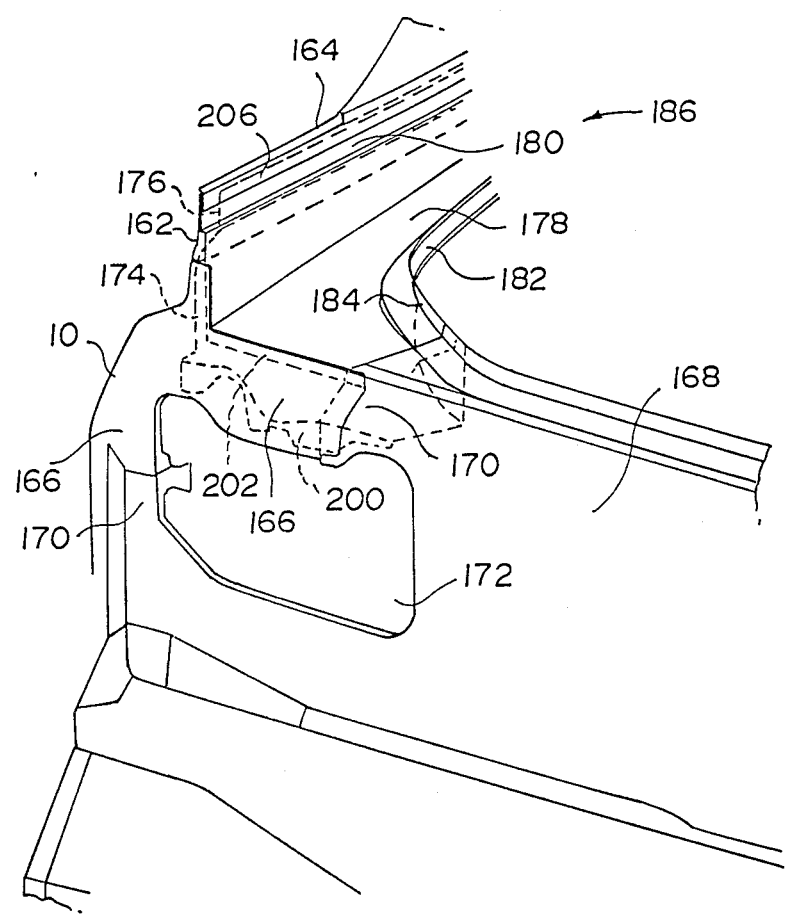

VEHICLE REAR BODY STRUCTURE

BACKGROUND OF THE INVENTION

1. Field of the Invention

The present invention relates to a vehicle body structure. More specifically, the present invention pertains to an improvement in the rear body structure.

2. Description of the Prior Art

For the purpose of reducing the weight of the vehicle body, it has been proposed to form the rear fender panel with a light weight material such as a plastic material, for example, the Japanese laid-open patent application 61-169375 discloses a vehicle rear body structure having a rear fender panel formed with a plastic material. In the structure proposed by the Japanese patent application, the plastic rear fender panel provides a rear side panel assembly with a rear inner panel which is made of a rigid metallic material. In order to provide the rear side panel assembly with an adequate rigidity, a channel shaped body side member is attached to the rear inner panel to form a structure of closed cross-section. Further, there is provided a rear pillar having a rearward extension which is also attached at the front edge portion to the rear portion of the rear inner panel and at the rear edge portion to a rear panel of a rear body section to form a structure of a closed cross-section.

The rear body structure as proposed by the Japanese patent application does not provide a satisfactory rigidity particularly in the vicinity of the tire house. In a vehicle body structure, the rear side structure is subjected to a load from the rear suspension assembly particularly at a portion around the tire house. Therefore, it is important to provide a high rigidity in this area.

SUMMARY OF THE INVENTION

It is therefore an object of the present invention to provide a vehicle rear body structure in which the area around the rear tire house is satisfactorily reinforced.

Another object of the present invention is to provide a vehicle rear body structure having a rear fender panel made of material of a small rigidity but with a satisfactory rigidity in the vicinity of the rear tire house.

A further object of the present invention is to provide a novel reinforcing structure in the vicinity of the rear tire house.

According to the present invention, the above and other objects can be accomplished by a rear side structure formed at the lower end portion with a tire house portion and including a rear fender panel and a rear inner panel connected with said rear fender panel, said rear inner panel being formed at the lower end portion with an arch-shaped structure of a closed cross-section located along the tire house portion of the rear side structure. According to the features of the present invention, the arch-shaped structure provides an increased rigidity at the area in the vicinity of the tire house so that the rear body structure can support the load which may be applied thereto from the rear suspension system.

Thus, according to the present invention, there is provided a vehicle rear body structure including a rear side panel assembly which includes a rear inner panel and a rear fender panel located laterally outside and connected with the rear inner panel, said rear side panel assembly being formed at a lower edge portion with an arch-shaped tire house portion for providing a space for receiving a rear wheel, said rear inner panel being formed along said tire house portion with reinforcement means of a closed cross-section. In a preferable aspect of the present invention, the rear side structure has an upper edge portion which defines a belt line of the rear body structure and the inner panel is formed along the upper edge portion with second reinforcement means of a closed cross-section. The inner panel is connected at a lower portion with a floor panel.

The above and other objects and features of the present invention will become apparent from the following descriptions of preferred embodiments taking reference to the accompanying drawings.

Figure 1:
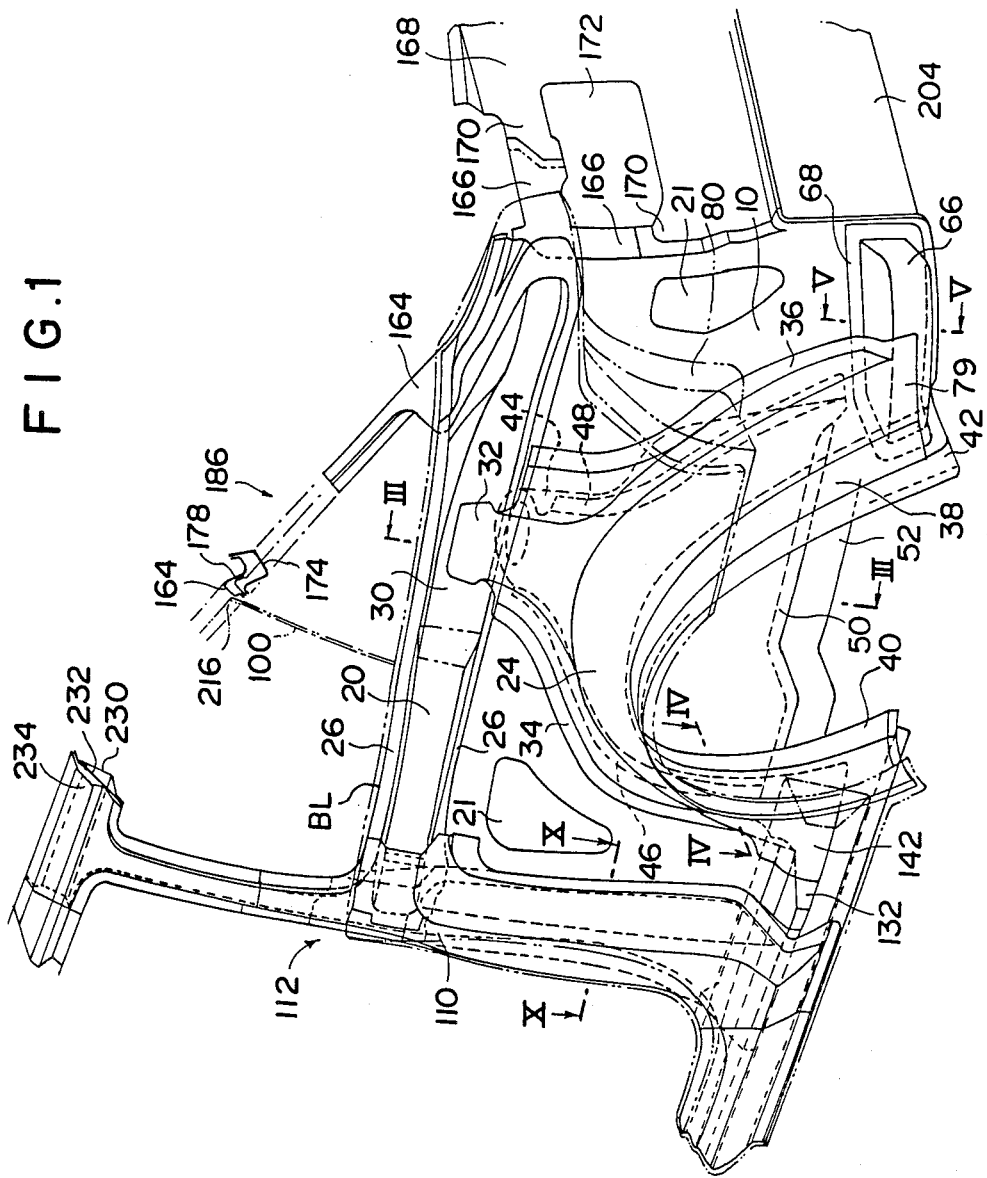
FIG. 1 is a fragmentary perspective view of a vehicle rear side structure in accordance with one embodiment of the present invention.
Figure 7:
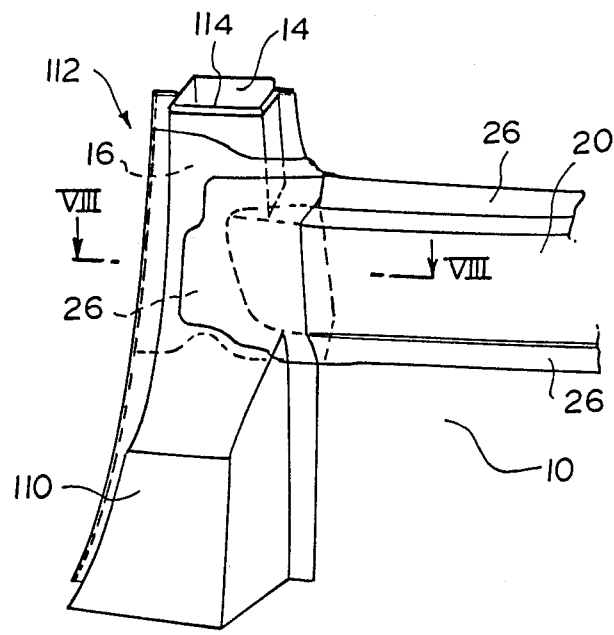
Figure 8:
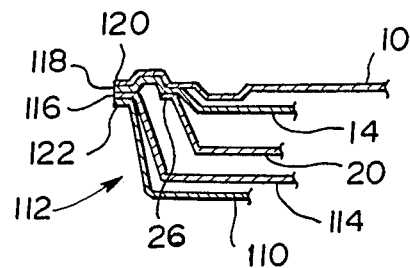
Figure 9:
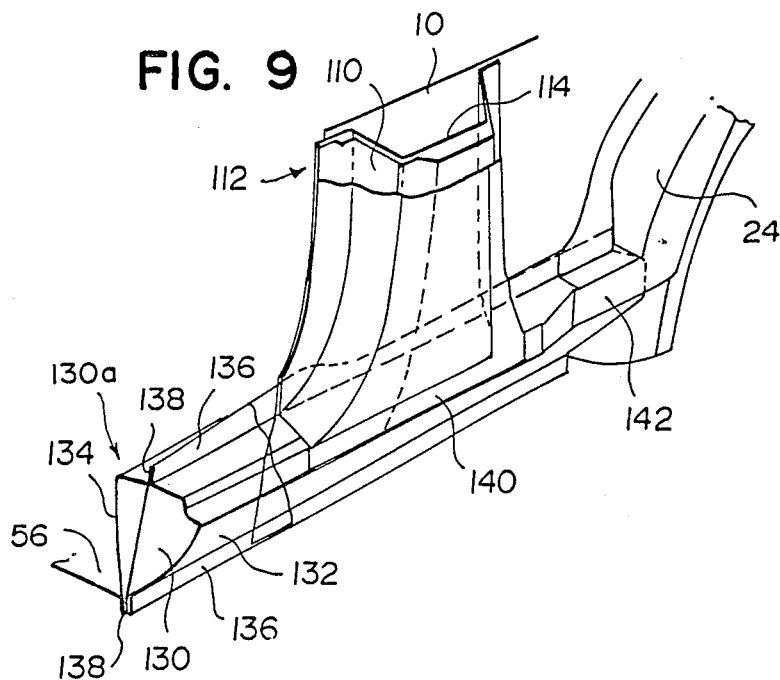
Figure 10A:
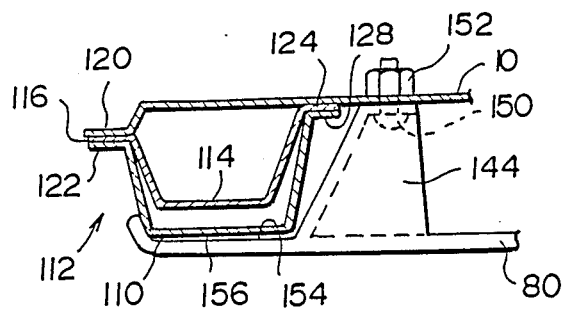
Figure 10B:
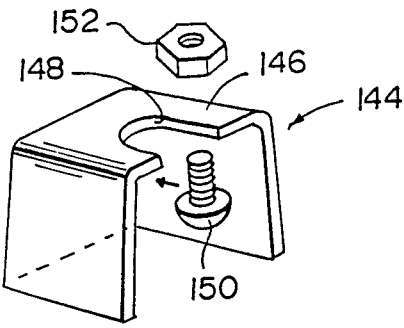
Figure 11:
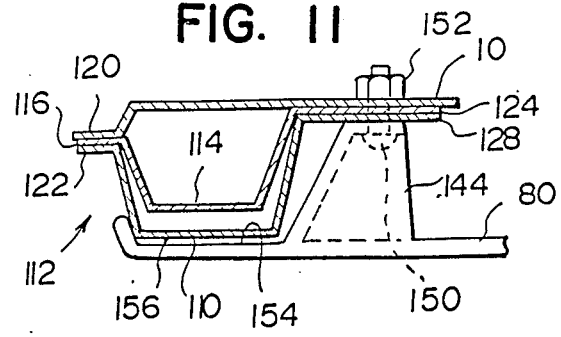
Figure 12:
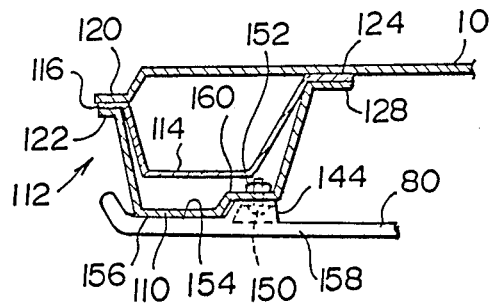
Figure 13:
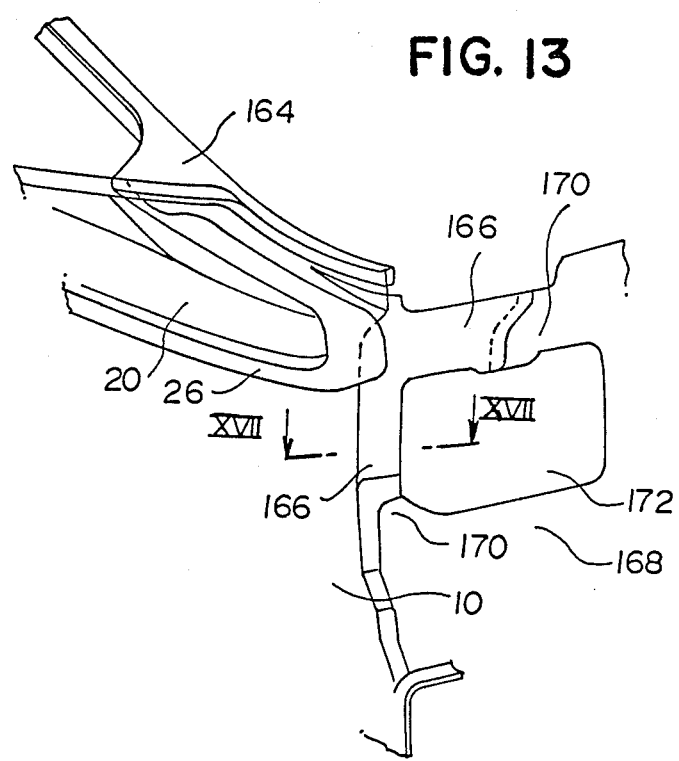
Figure 14:
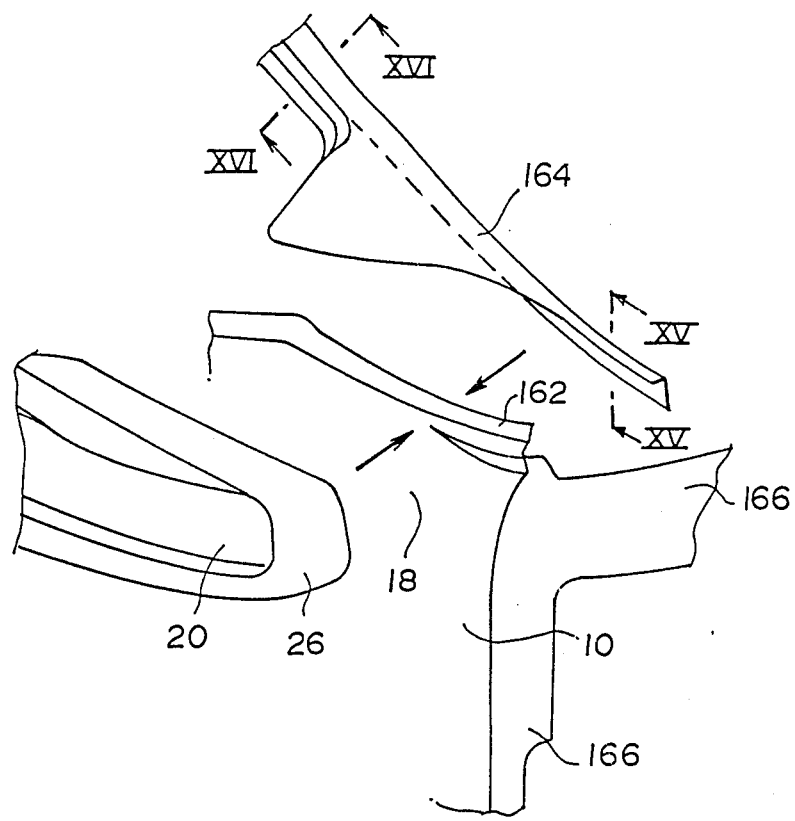
Figure 15:
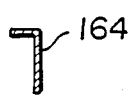
Figure 16:
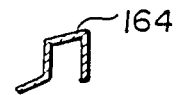
Figure 17:
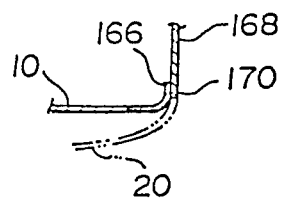
Figure 18:
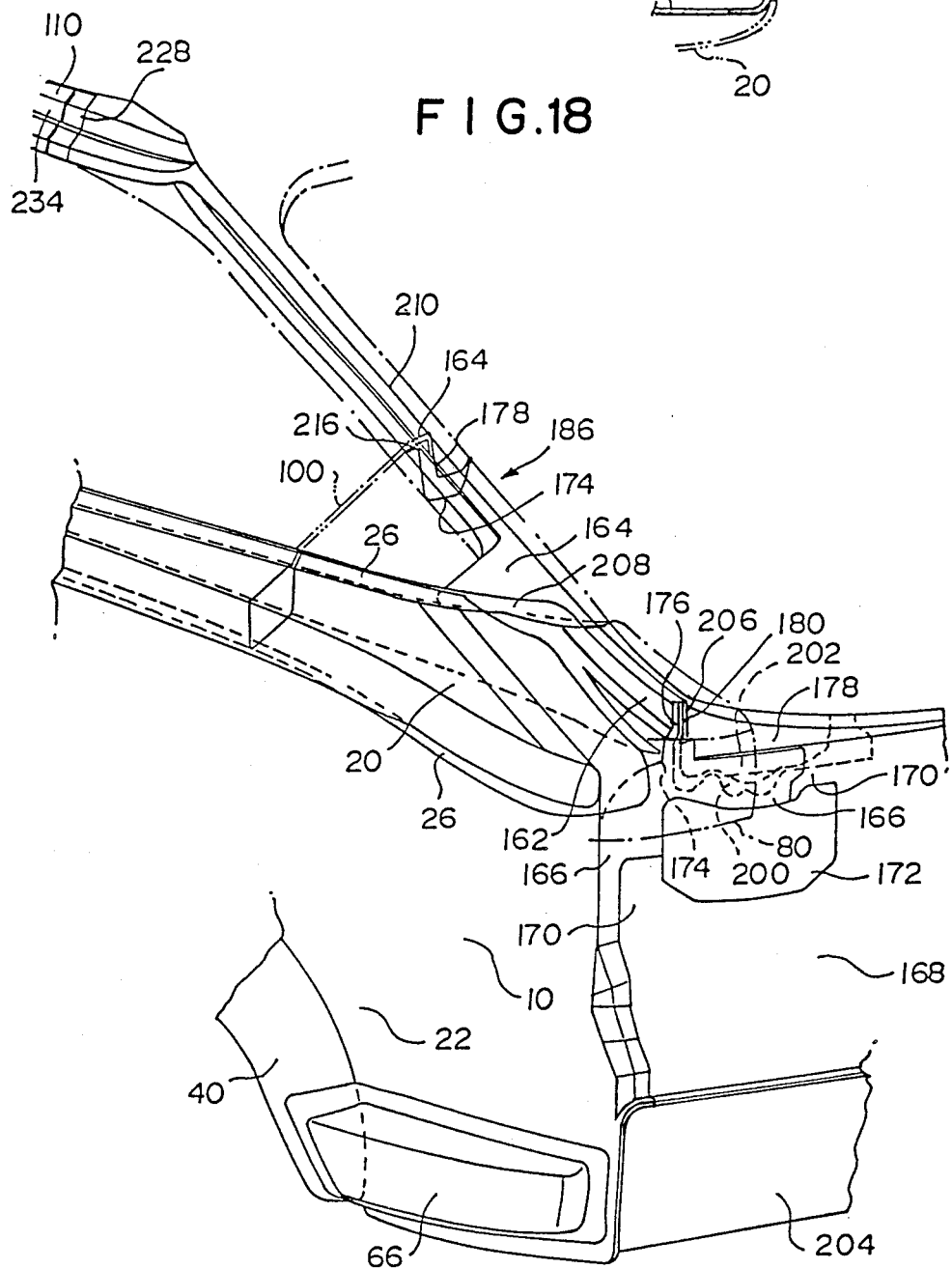
Figure 19:
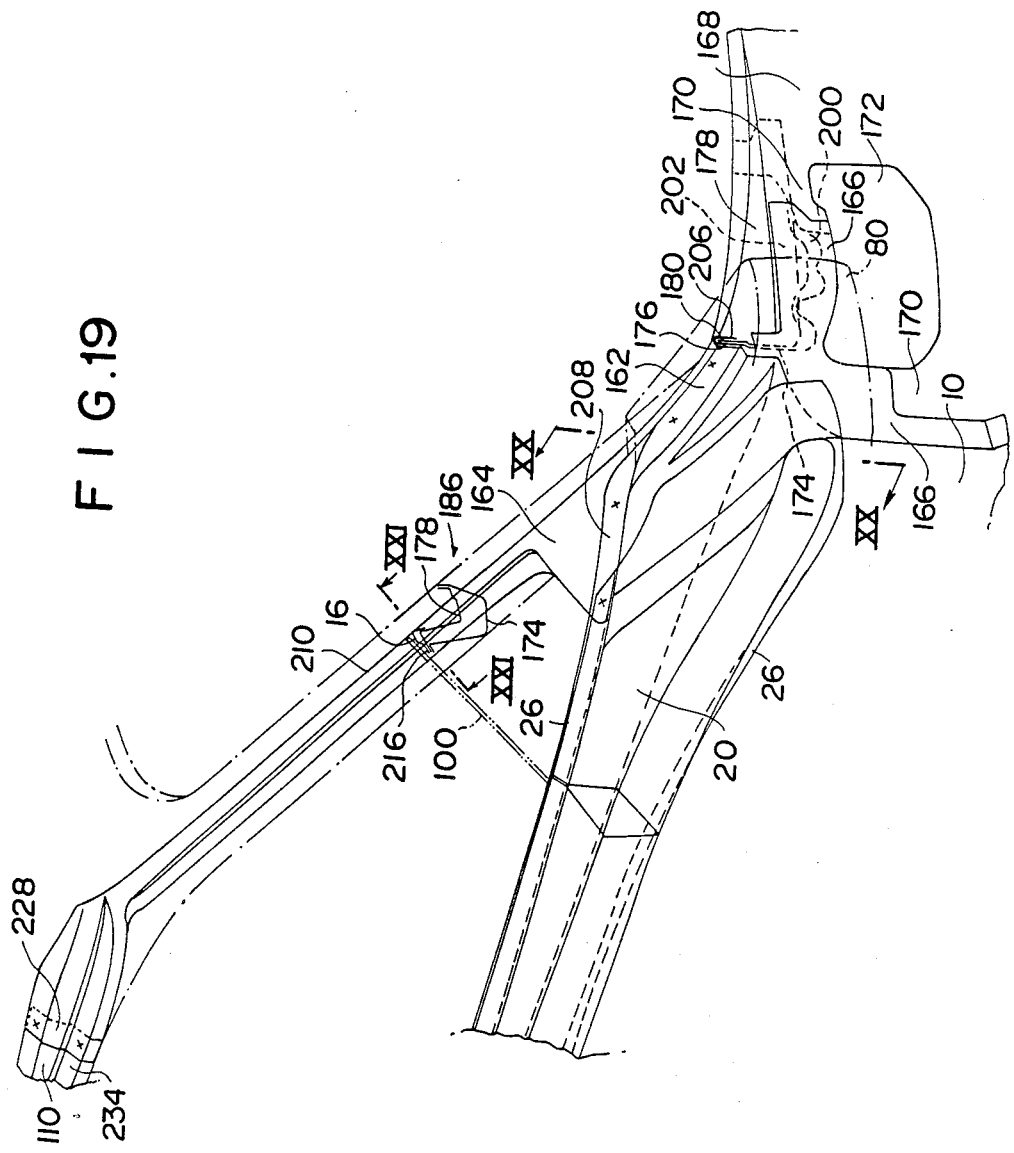
Figure 20:
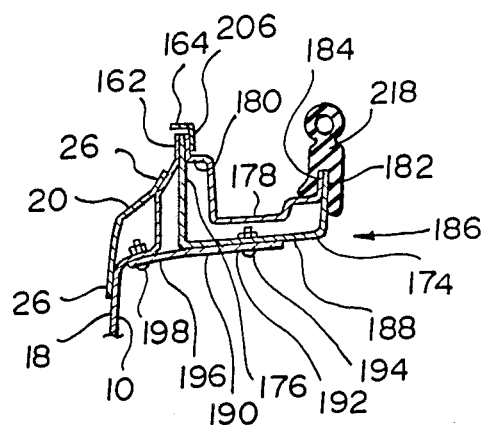
Figure 21:
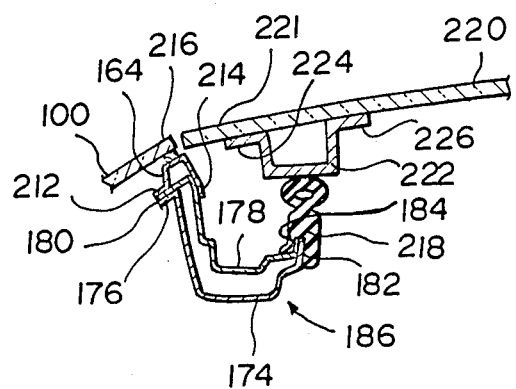
Figure 24:
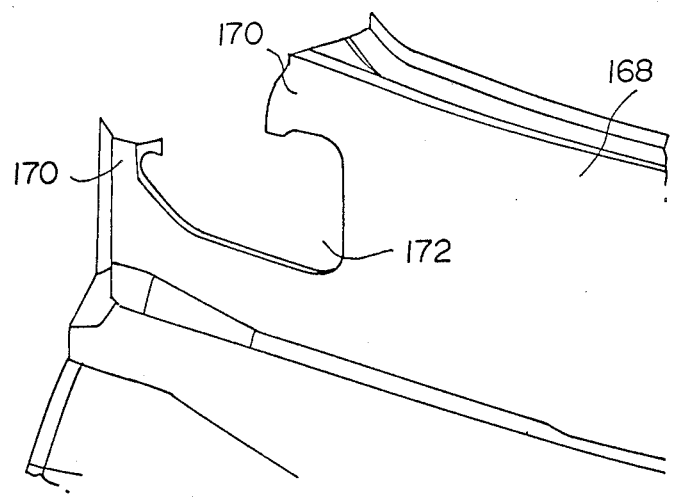
Figure 25:
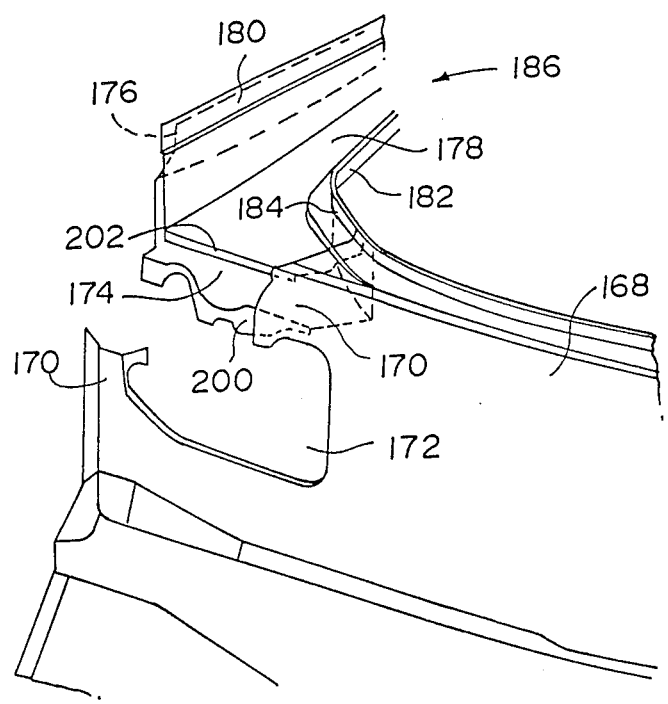
Figure 27:
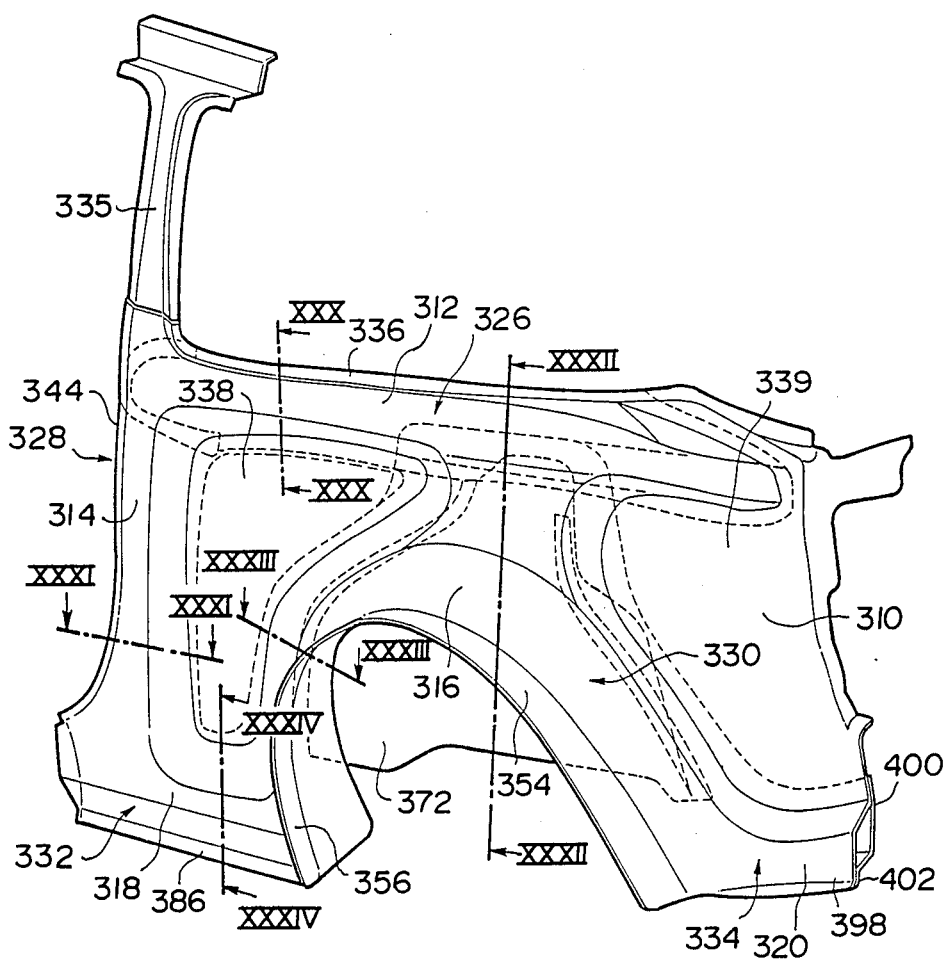
Figure 28:
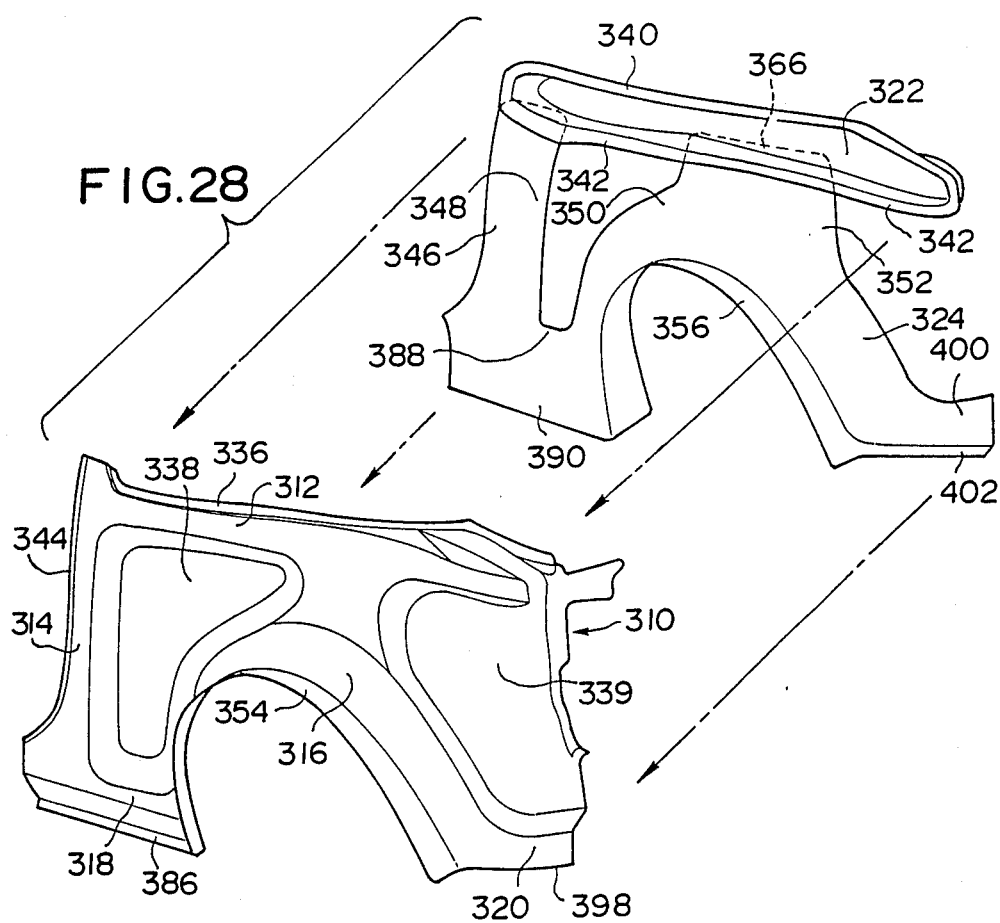
Figure 29:
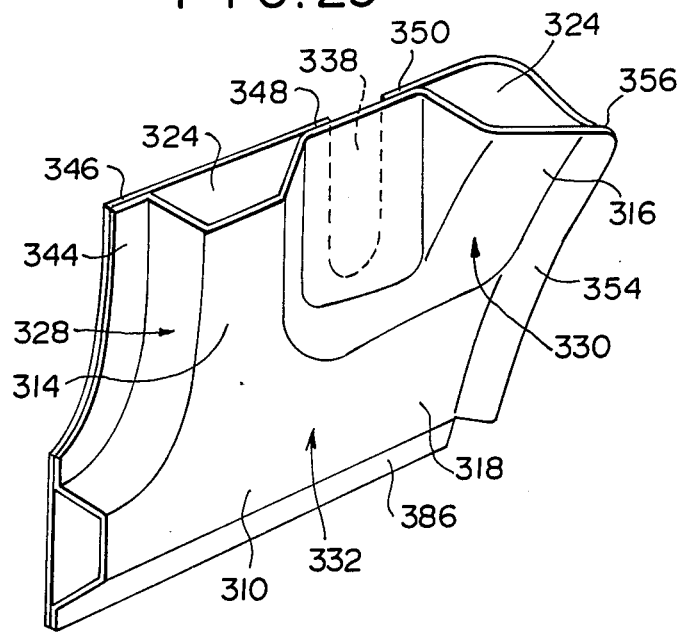
Figure 30:
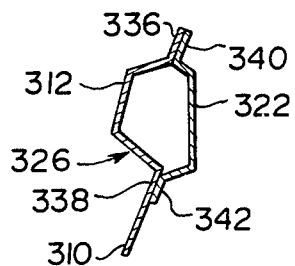
Figure 31:
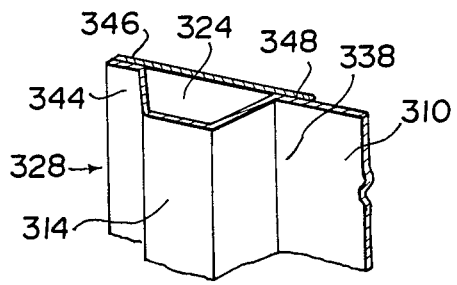
Figure 32:
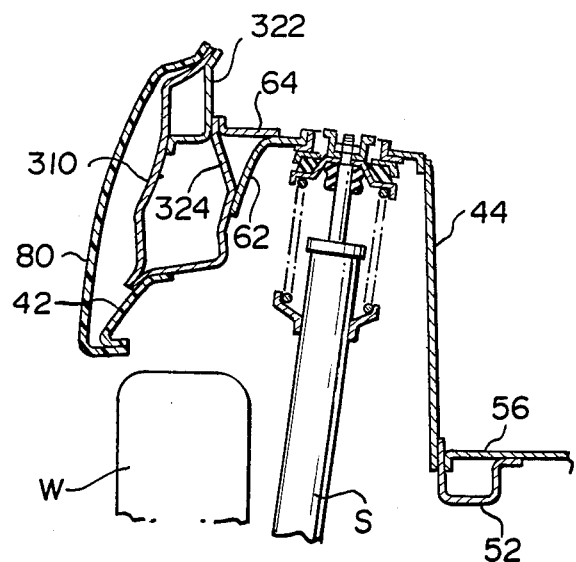
Figure 33:
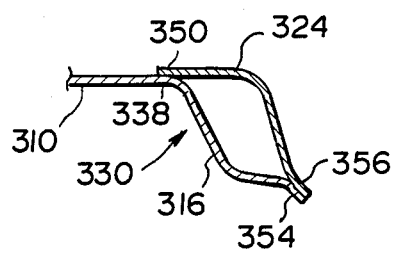
Figure 34:
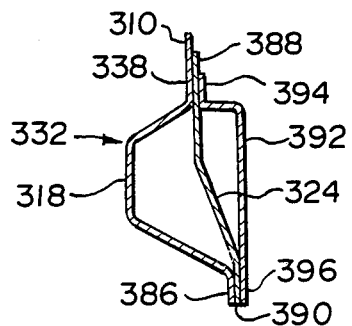

FIG .7 is a perspective view showing the connection between the center pillar and the rear side panel assembly;

FIG. 8 is a sectional view taken along the line VIII—VIII in FIG. 7;

FIG. 9 is a perspective view showing the connection between the enter pillar and the rear inner panel;

FIG. 10A is a sectional view taken along the line X—X in FIG. 1 and showing the connection between the center pillar and the rear fender panel;

FIG. 10B is a perspective view showing the connecting fitting used in the structure shown in FIG. 10A;

FIG. 11 is a sectional view showing another example of the connection between the rear fender panel and the center pillar;

FIG. 12 is a sectional view showing a further example of the connection between the rear fender panel and the center pillar;

FIG. 13 is a perspective view showing the rear structure;

FIG. 14 is an exploded view of the rear structure;

FIG. 15 is a sectional view taken along the line XV—XV in FIG. 14;

FIG. 16 is a sectional view taken along the line XVI—XVI in FIG. 14;

FIG. 17 is a sectional view taken along the line XVII—XVII in FIG. 13;

FIG. 18 is a perspective view showing further details of the rear structure;

FIG. 19 is an enlarged view of a portion of the structure shown in FIG. 18;

FIG. 20 is a sectional view taken along the line XX—XX in FIG. 19;

FIG. 21 is a sectional view taken along the line XXI—XXI in FIG. 19;

FIG. 22 is a perspective view showing the connection between the front portion of the rear pillar reinforcement and the upper portion of the side frame outer panel;

FIG. 23 is a sectional view taken along the line XXIII—XXIII in FIG. 22;

FIG. 24 is a perspective view of the rear end panel;

FIG. 25 is a perspective view showing the connection between the rear end panel, the rear pillar outer panel and the rear pillar inner panel;

FIG. 26 is a perspective view showing the connection between the rear end panel, the rear pillar outer panel, the rear pillar inner panel, the rear inner panel and the rear pillar reinforcement;

FIG. 27 is a perspective view showing a vehicle rear side structure in accordance with another embodiment of the present invention;

FIG. 28 is an exploded view of the structure shown in FIG. 27;

FIG. 29 is a perspective view showing the front lower portion of the structure shown in FIG. 27;

FIG. 30 is a sectional view taken along the line XXX—XXX in FIG. 27;

FIG. 31 is a perspective view showing the portion below the line XXXI—XXXI in FIG. 27;

FIG. 32 is a sectional view taken along the line XXXII—XXXII in FIG. 27;

FIG. 33 is a sectional view taken along the line XXXIII—XXXIII in FIG. 27; and,

FIG. 34 is a sectional view taken along the line XXXIV—XXXIV in FIG. 27.

DESCRIPTION OF THE PREFERRED EMBODIMENTS

Figure 2:
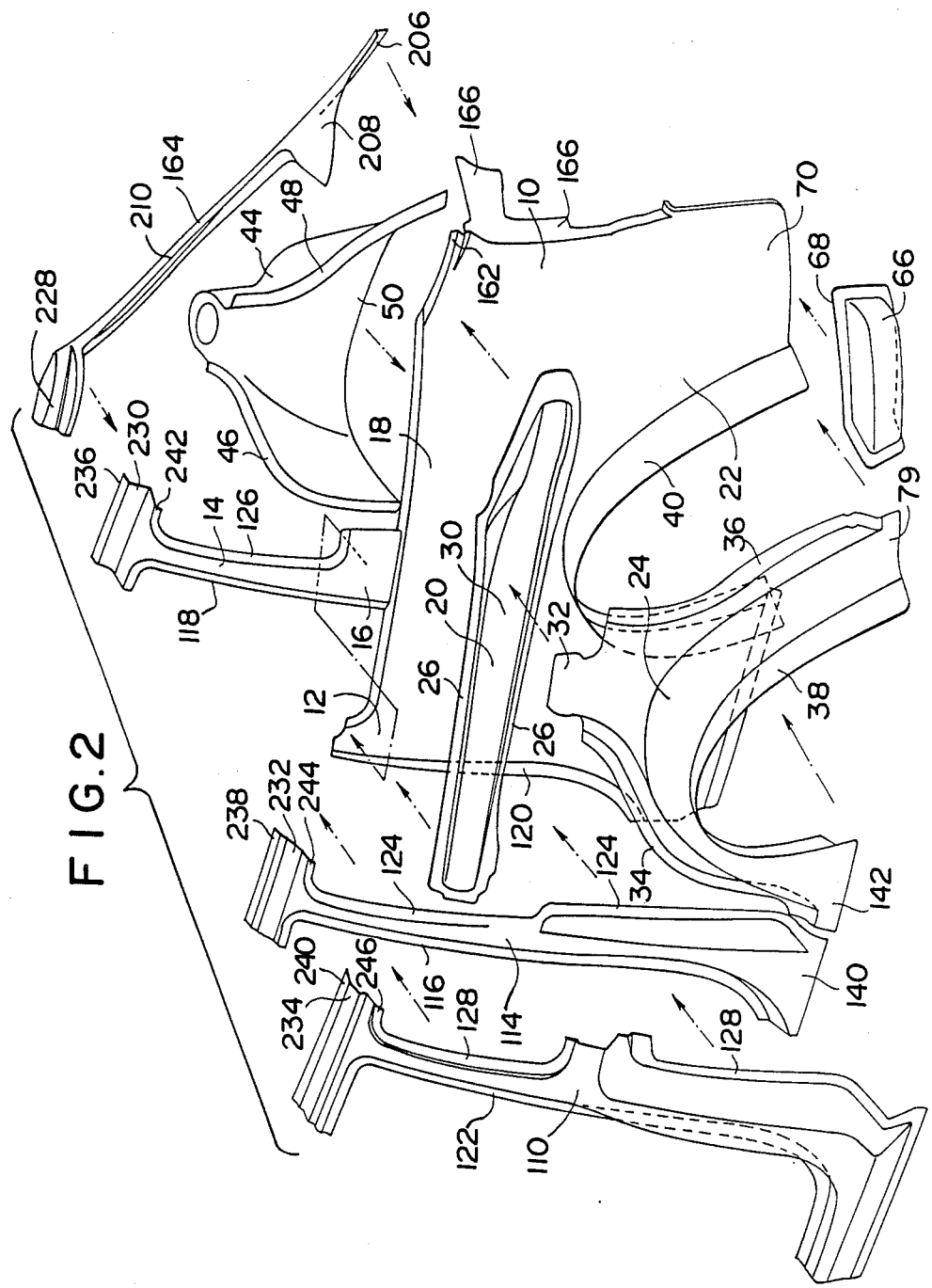
FIG. 2 is an exploded view of the vehicle rear side structure shown in FIG. 1.

Referring now to the drawings, particularly to FIGS. 1 and 2, there is shown a vehicle body rear side structure including a rear inner panel 10 made of a metal sheet such as a steel sheet and having an upper edge which defines a belt line BL of the vehicle body. The rear inner panel 10 has a front upper end portion 12 connected with a lower end portion 16 of a center pillar inner panel 14. The rear inner panel 10 has an upper portion 18 connected with a belt line reinforcement 20 of a channel-shaped cross-section. The belt line reinforcement 20 provides together with the rear inner panel 10 a structure of a closed cross-section. The rear inner panel 10 is formed with access holes 21 as shown in FIG. 1.

Figure 3:
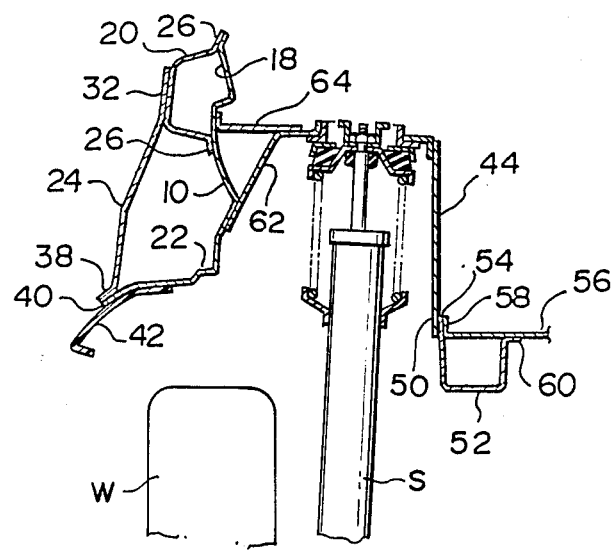
FIG. 3 is a sectional view taken along the line III—III in FIG. 1.

It will further be noted in FIGS. 1 and 2 that the rear inner panel 10 is formed at a lower portion with a tire house section 22 which has a tire house flange 40 of an arcuate shape. A tire house reinforcement 24 of a substantially arcuate shape is attached to the rear inner panel at the tire house section 22. Referring to FIG. 3 in addition to FIGS. 1 and 2, it will be noted that the tire house reinforcement 24 has a lower flange 38 which is attached by for example spot welding to the tire house flange 40 and an upper front flange 34 and an upper rear flange 36 which are attached to the rear inner panel 10 to provide a structure of a closed cross-section. A belt line reinforcement 20 is provided to extend in a fore-and-aft direction of the vehicle and has upper and lower flanges 26 which are attached to the upper portion 18 of the rear inner panel 10 to form a structure of closed cross-section.

At the longitudinally center portion between the flanges 34 and 36, the tire house reinforcement 24 is formed with an upward extension having an upper portion 32 attached to the belt line reinforcement 20. It will therefore be understood that the structure of closed cross-section provided by the tire house reinforcement 24 and the tire house section 22 on the rear inner panel 10 provides a high rigidity in the vicinity of the tire house. The tire house flange 40 in the tire house section 22 formed on the rear inner panel 10 is provided with a mud guard 42 which may be formed of a plastic material.

Figure 4:
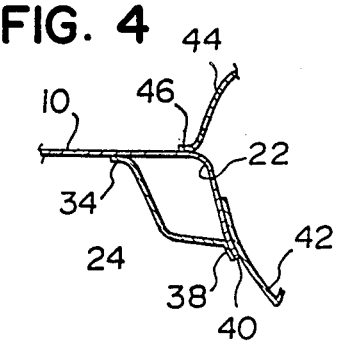
FIG. 4 is a sectional view taken along the line IV—IV in FIG. 1.
Figure 5:
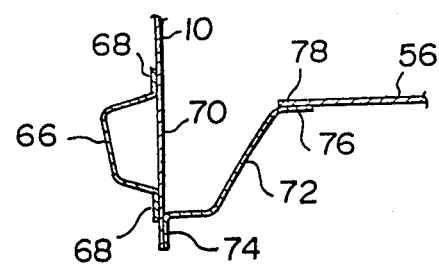
FIG. 5 is a sectional view taken along the line V—V in FIG. 1.

As shown in FIG. 3, there is provided a tire house inner panel 44 at a transversely inward side of the rear inner panel 10. As shown in FIG. 2, the panel 44 has a front flange 46 and a rear flange 48 which are attached to the transversely inner surface of the rear inner panel 10 as shown in FIGS. 1, 2 and 4. There is provided a floor panel 56 which is attached at each side edge portion to a rear side frame 52 of a channel shaped cross section. The rear side frame 52 is attached at a transversely outer side 54 with an edge 58 of the floor panel 56 and with a lower end portion 50 of the tire house inner panel 44. The other side 60 of the rear side frame 52 is attached to the floor panel 56.

A suspension strut supporting frame 62 is provided to bridge the tire house inner panel 44 and the rear inner panel 10 as shown in FIG. 3. A gusset plate 64 is attached at one end to the panel 10 and at the other end to the frame 62 to securely fix the suspension supporting frame 62. In the space provided by the tire house section 22, there is disposed a rear wheel W as well known in the art. A suspension strut assembly S is disposed between the rear wheel W and the supporting frame 62. The upper end of the suspension strut assembly S is attached to the frame 62 to be supported thereby.

Rearwards the tire house section 22, the rear inner panel 10 is attached with a lower reinforcement 66. The reinforcement 66 has a peripheral flange 68 which is attached for example by spot welding to a rear lower portion 70 and the arcuate flange 40 of the rear inner panel 10. As shown in FIG. 1, the reinforcement 66 is further attached to a rear end portion 79 of the tire house reinforcement 24. The rear lower lower portion 70 of the rear inner panel 10 is further connected with the floor panel 56 through a floor side panel 72 which has one end 74 connected with the rear lower portion 70 of the rear inner panel 10 and the other end 76 connected with an edge portion 78 of the floor panel 56.

Figure 6A:
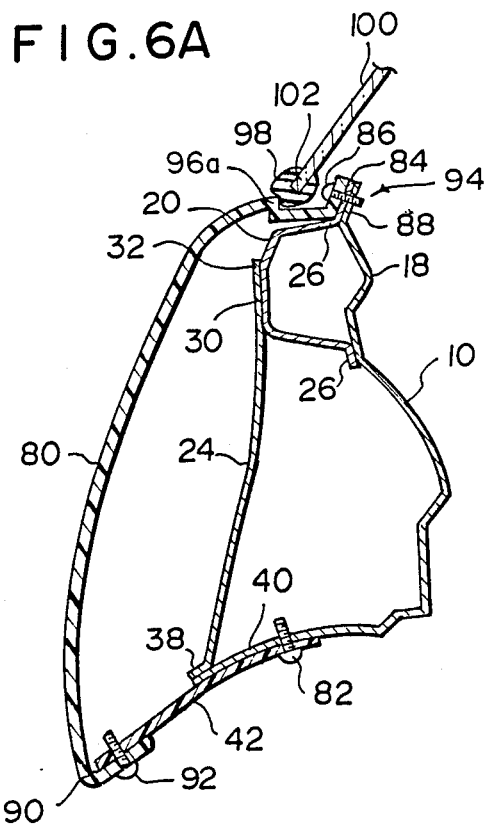
FIG. 6A is a sectional view showing the portion shown in FIG. 3 with the rear fender panel attached to the rear inner panel.

Referring now to FIG. 6A, there is shown a structure for attaching a rear fender panel 80 to the rear inner panel 10. As previously described, the belt line reinforcement 20 is attached to the upper portion 18 of the rear inner panel 10. The tire house reinforcement 24 is attached at the upper portion 32 to the belt line reinforcement 20. The tire house reinforcement 24 is connected at the lower edge portion 38 with the tire house flange 40 on the rear inner panel 10 as already described. The mud guard 42 is attached to the tire house flange 40 by means of screws 82.

The rear fender panel 80 is made of a plastic material and has an upper edge portion 84 attached by means of screws 86 with the flange 26 of the belt line reinforcement 20 and with an upper edge portion 88 of the rear inner panel 10. The rear fender panel 80 is also attached at the lower edge portion 90 through screws 92 with the mud guard 42. The rear fender panel 80 is formed at a portion adjacent to the upper edge portion 84 but transversely outside the upper edge portion 84 with window glass support 96 which is provided with weather strip 98 supporting a lower end 102 of a rear quarter window glass 100. The weather strip 98 covers the window glass support 96a to provide an improved appearance.

Figure 6B:
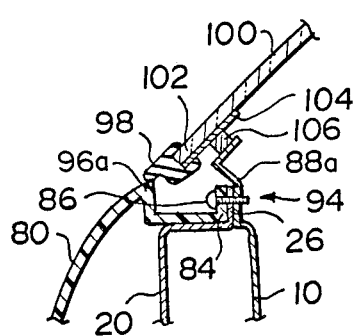
FIG. 6B and 6C are sectional views similar to FIG. 6A but showing other embodiments.

Referring to FIG. 6B, there is shown another example of the structure for connecting the rear fender panel 80 to the rear inner panel 10. In this example, the rear quarter window glass panel 100 is provided at the lower edge portion 102 with a coating 104 of a ceramic material which is supported through a support member 106 by the upper edge portion 88a of the rear inner panel 10. In accordance with the structure shown in FIG. 6B, the coating 104 of the ceramic material covers the structure 94 in the vicinity of the upper edge portion of the rear inner panel 10 to thereby improve the appearance.

Figure 6C:
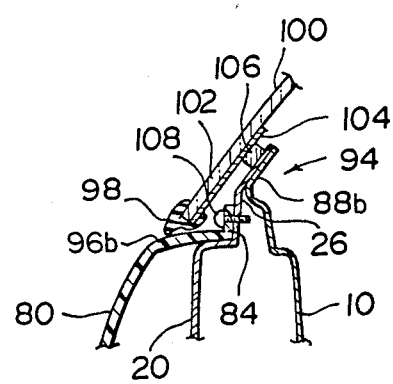

FIG. 6C shows a further example of the corresponding structure. In this example, the upper edge portion 84 of the rear fenderpanel 80 is attached through screws 108 to the belt line reinforcement 20. At the upper edge portion, the rear fender panel 80 is stepped as shown by the reference numeral 96b to provide the rear quarter glass support. As in the example shown in FIG. 6B, the rear quarter glass panel 100 is coated at the lower edge portion 102 by a ceramic coating 104 which is supported through a support member 106 by the flange 26 on the belt line reinforcement 20 and the upper edge portion 88b of the rear inner panel 10.

Referring now to FIGS. 7 and 8, there is shown a structure for connecting the side panel structure to the center pillar. Referring to FIGS. 7 and 8 together with FIGS. 1 and 2, there is provided a side frame outer panel 110 which extends along the center pillar inner panel 14 and the front edge portion of the rear inner panel 10. The side panel structure 110 is connected at the front and rear edge portions by spot welding to the center pillar inner panel 14 to form the center pillar structure 112. In the center pillar structure 112, there is provided a center pillar reinforcement 114. More specifically, the reinforcement 114 has a front flange 116 which is disposed between a front flange 118 of the center pillar inner panel 14 and a front flange 122 of the side frame outer panel 110. The rear inner panel 10 has a front flange 120 which is laid over the front flange 118 of the center pillar inner panel 14. The flanges 116, 118, 120 and 122 are welded together. Further, the center pillar reinforcement 114 has a rear flange 124 which is between a rear flange 126 of the center pillar inner panel 14 and a rear flange 128 of the side frame outer panel 110. The rear inner panel 10 is laid over the rear flange 124 of the center pillar inner panel 14. The flanges 124, 126 and 128 are welded to the rear inner panel 10. As shown in FIG. 7, the belt line reinforcement 20 is connected by welding to the outer side of the side frame outer panel 110. It will therefore be understood that rigid connections are established from the tire house section 22 through the belt line reinforcement 20 to the center pillar structure 112. Therefore, the load applied to the rear body structure at the tire house section 22 is in part transmitted through the belt line reinforcement 20 to the center pillar structure 112 and then to the roof structure.

FIG. 9 shows a structure for connecting the center pillar structure 112 to the lower portion of the rear inner panel 10. At each side of the floor panel 56, there is provided a side sill structure 130a which includes a side sill outer panel 132 and a side sill inner panel 134. A side sill reinforcement 130 is provided between the side sill outer panel 132 and the side sill inner panel 134. The side sill outer panel 132 has flanges 136 formed at the upper and lower edge portions and the side sill inner panel 134 has flanges 138 formed at the upper and lower edge portions. The flanges 136 and 138 are welded to the side sill reinforcement 130 at the opposite sides of the reinforcement 130 to form the side sill structure 130a.

The center pillar reinforcement 114 has a lower end portion 140 which is connected with the side sill outer panel 132. The side sill outer panel 132 is also connected with a front lower end portion 142 of the tire house reinforcement 24.

Referring now to FIG. 10A, it will be noted that the center pillar structure 112 in this portion is constituted by the rear inner panel 10, the center pillar reinforcement 114 and the side frame outer panel 110. The front flange 116 of the center pillar reinforcement 114 is laid between and welded to the front flange 120 of the rear inner panel 10 and the front flange 122 of the center pillar outer panel 110. The rear flange 124 of the center pillar reinforcement 114 is laid between and welded to the rear flange 128 of the center pillar. outer panel 110 and the rear inner panel 10. The rear fender panel 80 is formed at the front end portion with a connecting bracket portion 144 which is of a configuration as shown in FIG. 10B. The bracket portion 144 has a flat mating portion 146 which is formed with a cutout 148. As shown in FIG. 10A, the rear fender 80 is laid on the rear inner panel 10 with the mating portion 146 in contact with the panel 10. A bolt 150 is passed through the cutout 148 in the bracket portion 144 and through the panel 10 and engaged with a nut 152 to securely fix the rear fender 80 to the rear inner panel 10. It will be noted in FIG. 10A that the front end portion of the rear fender panel 80 covers the outside surface 156 of the side frame outer panel 110 of the center pillar structure 112.

FIG. 11 shows an alternative form of the connection between the rear fender panel 80 and the rear inner panel 10. As shown, the rear flange 124 of the center pillar reinforcement 114 and the rear flange 128 of the side frame outer panel 110 are rearwardly extended and the bracket portion 144 of the rear fender panel 80 is laid over the rear flange 128 of the side frame outer panel 110. In FIG. 12, there is shown a further form of connection between the rear fender panel 80 and the center pillar structure 112. In this example, the side frame outer panel 110 is formed with a stepped portion 160 which receives the bracket portion 144 of the rear fender panel 80.

Referring to FIGS. 13 and 14, there is shown a rear body structure. The rear inner panel 10 is formed at the rear upper edge portion with a flange 162 which is connected with a rear pillar reinforcement 164. The rear pillar reinforcement 164 is formed with sectional configurations as shown in FIGS. 15 and 16. The rear inner panel 10 has a rear end portion 166 which is transversely inwardly bent and connected with a sideward edge 170 of a rear end panel 168 as shown in FIG. 17. Between the rear end portion 166 of the rear inner panel 10 and the rear end panel 168, there is defined an opening 172 for a tail lamp.

Referring to FIG. 18, it will be noted that a rear pillar structure 186 is formed by a rear pillar inner panel 174 and a rear pillar outer panel 178 together with the aforementioned rear pillar reinforcement 164. As shown in FIGS. 20 and 21, the rear pillar inner panel 174 has a front flange 176 which is laid over and connected to a front flange 180 of the rear pillar outer panel 178. Further, the rear pillar inner panel 174 has a rear flange 182 which is laid over and connected to a rear flange 184 of the rear pillar outer panel 178. In the intermediate portion of the rear pillar structure 186, the rear pillar reinforcement 164 is connected to the outer panel 178 at a front flange 212 and a rear flange 214. In the lower end portion of the rear pillar structure 186, the reinforcement 164 is connected to the outer panel 178 at a flange 206.

As shown in FIGS. 18 and 19, the upper end flange 162 of the rear inner panel 10 is connected with the flange 176 of the rear pillar inner panel 174 and the flange 180 of the rear pillar outer panel 178. Further, as shown in FIG. 20, the rear pillar inner panel 174 has a lower portion 188 which is connected through a gusset 190 with the rear inner panel 10. More specifically, the gusset 190 has one end 192 connected through screws 194 to the lower portion 188 of the rear inner panel 174 and the other end 196 connected through screws 198 with the rear inner panel 10.

In FIGS. 18 and 19, it will further be noted that the rear inner panel 174 has a rear end flange 200 which is connected with the rear portion 166 of the rear inner panel 10 and the side edge portion 170 of the rear end panel 168. Similarly, the rear pillar outer panel 178 has a rear end flange 202 which is connected to the rear portion 166 of the rear inner panel 10 and the side edge portion 170 of the rear end panel 168. The rear inner panel 10 is further connected with a cross member 204 as shown in FIG. 18.

As shown in FIGS. 2, 18 and 19, the rear pillar reinforcement 164 is formed at a lower portion with a side flange 208 which is connected with the rear inner panel 10 and the belt line reinforcement 20. The rear pillar reinforcement 164 is formed at an intermediate portion 210 with a stepped portion for receiving an upper edge 216 of a rear quarter window glass 100. The flanges 182 and 184 of the panels 174 and 178 carry a weather strip 218 for engagement with a back door. More specifically, the back door includes a back door glass 220 having a side edge portion 221 attached with a door frame 222. The door frame 222 has flanges 224 and 226 which is connected to the back door glass 220. The door frame 222 is adapted to be engaged with the weather strip 218 when the back door is closed.

Referring to FIGS. 1 and 2, the center pillar inner panel 14, the center pillar reinforcement 114 and the side frame outer panel 110 respectively have upper portions 230, 232 and 234 which are connected together to form a roof rail. The upper portions 230, 232 and 234 respectively have upper end flanges 236, 238 and 240 which are welded together. Further, the upper portions 230, 232 and 234 respectively have lower end flanges 242, 244 and 246 which are welded together. The rear pillar reinforcement 164 has a front portion 228 which is connected to the upper portion 234 of the side frame outer panel 110. As shown in FIGS. 22 and 23, the front portion 228 of the rear pillar reinforcement 164 is formed in the same configuration as the upper portion 234 of the side frame outer panel 110 and connected with the portion 234.

Referring to FIGS. 24, 25 and 26, it will be noted that the flange 202 of the rear pillar outer panel 178 and the flange 20 of the rear pillar inner panel 174 are connected with the side edge portion 170 of the rear end panel 170. The figures also show the structure wherein the flanges 200 and 202 of the rear pillar inner panel 174 and rear pillar outer panel 178, respectively, are connected with the rear portion 166 of the rear inner panel 10 and wherein the flange 176 of the rear inner panel 174 is connected with the flange 162 of the rear inner panel 10.

Further, the rear portion 206 of the rear pillar reinforcement 164 is shown as being connected with the flange 180 of the rear pillar outer panel 178.

Referring now to FIGS. 27 through 29 showing a further embodiment of the present invention, it will be noted that the structure shown therein includes a rear inner panel 310 formed with bulged portions 312, 314, 316 318 and 320 for reinforcing the panel 310. The bulged portion 312 is formed along the upper edge portion of the panel 310 to provide a belt line reinforcement. The bulged portion 314 is formed along the front end portion of the panel 310 to provide a center pillar reinforcement. The bulged portion 316 is formed in an arcuated configuration along the tire house section to form a tire house reinforcement. The bulged portions 318 and 320 are formed respectively forwardly and rearwardly of the bulged portion 316 to provide lower reinforcements. The bulged portions 316, 318 and 320 are contiguous with each other.

In the transversely inside of the rear inner panel 310, there is provided a reinforcement panel 322 which is located to cooperate with the bulged portion 312. The panel 322 has upper and lower flanges 340 and 342, respectively, as shown in FIG. 30 and the flanges 340 and 342 are connected by for example welding to portions 336 and 338 provided on the rear inner panel 310 above and below the bulged portion 312 to provide a reinforcement structure 326 of closed cross section. There is further provided a reinforcement 324 which is formed and located to cooperate with the bulged portions 314, 316, 318 and 320. The panel 324 is welded to the rear inner panel 310 to provide reinforcement structures of closed cross section together with the bulged portions 314, 316, 318 and 320.

In FIG. 28, it will be noted that the reinforcement panel 324 has a substantially vertically extending front portion provided with a front edge portion 346 and a rear edge portion 348 which are welded respectively to a front connecting flange 344 formed in the rear inner panel 310 forwardly of the bulged portion 314 and to a welding web portion 338 formed in the rear inner panel 310 between the bulged portions 314 and 316 to form the aforementioned reinforcement 328. The reinforcement 328 is also shown in detail in FIG. 31. The reinforcement panel 324 further has a front lower portion provided with an upper edge portion 388 and a lower edge portion 390 which are respectively welded to the welding web portion 338 and a front lower flange 386 of the rear inner panel 310 to form the reinforcement 332 as shown in FIG. 34. A front lower reinforcement 392 is also welded to the reinforcement panel 324. The reinforcement 392 has an upper flange 394 and a lower edge portion 396 which are welded to the reinforcement panel 324.

Similarly, the reinforcement panel 324 has a rear lower portion provided with an upper edge portion 400 and a lower edge portion 402 which are respectively connected with a welding web portion 339 formed in the rear inner panel 310 rearwardly of the bulged portion and a lower flange 398 formed in the rear inner panel 310 below the bulged portion 320 to form the reinforcement 334. The reinforcement panel 324 also has an arcuated portion formed between the front lower portion and the rear lower portion and provided with a front upper edge portion 350 and a rear upper edge portion 352 which are welded to the welding webs 338 and 339, respectively. The panel 324 is also formed with an arcuate lower flange 356 which is welded to the arcuate flange 354 of the rear inner panel 310 to form the reinforcement 332. There is also formed in the reinforcement panel 324 an upright extension extending upward from the center portion of the arcuated portion. As shown in FIGS. 29 and 33, the upright extension is welded to the welding web 338 and the arcuated flange 356 in the rear inner panel 310 to provide the reinforcement 330.

As shown in FIG. 28, the reinforcement panels 322 and 324 are connected together. Further, referring to FIG. 32, there is provided a mud guard 42 which is connected to the reinforcement panel 324 at the lower end thereof. A rear fender panel 80 made of a plastic material is also attached to the rear inner panel 310 as in the previous embodiment. FIG. 32 corresponds to FIG. 3 of the previous embodiment except that the rear fender panel 80 is not shown in FIG. 3. Therefore, corresponding parts are designated by the same reference numerals as in the previous embodiment and detailed descriptions will be omitted.

The invention has thus been shown and described with reference to specific embodiments, however, it should be noted the the invention is in no way limited to the details of the illustrated structures but changes and modifications may be made without departing from the scope of the appended claims.

We claim:

1. A vehicle rear body structure including a rear inner panel having a bulged portion extending longitudinally, a first reinforcement panel extending longitudinally along the bulged portion and joined with an inner side surface of the rear inner panel to form a belt line reinforcement structure of a closed cross-section, a second reinforcement panel having an arcuate configuration and joined with the inner side surface of the rear inner panel at a lower end portion and joined with the first reinforcement panel at an upper end portion so that a space is formed under a tire housing flange formed at a lower end portion of the second reinforcement for receiving a rear wheel, and the rear inner panel, the first and second reinforcement panels being joined to form a tire housing reinforcement structure of a closed cross-section which extends forwardly to a side sill structure which forms a lower side frame structure of the body structure and extends rearwardly to a lower flange portion of the rear inner panel formed at a rear end portion thereof.

* * * * *